United States Patent
Diab et al.

(10) Patent No.: US 8,286,007 B2
(45) Date of Patent: Oct. 9, 2012

(54) HYBRID TECHNIQUE IN ENERGY EFFICIENT ETHERNET PHYSICAL LAYER DEVICES

(75) Inventors: Wael William Diab, San Francisco, CA (US); Howard Frazier, Pleasanton, CA (US); Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 453 days.

(21) Appl. No.: 12/369,026

(22) Filed: Feb. 11, 2009

(65) Prior Publication Data

US 2009/0204828 A1 Aug. 13, 2009

Related U.S. Application Data

(60) Provisional application No. 61/028,362, filed on Feb. 13, 2008.

(51) Int. Cl.
*G06F 1/32* (2006.01)
(52) U.S. Cl. ......... 713/300; 713/322; 713/323; 713/324
(58) Field of Classification Search .................. 713/300, 713/322, 323, 324
See application file for complete search history.

(56) References Cited

U.S. PATENT DOCUMENTS

| | | | |
|---|---|---|---|
| 2002/0046355 A1* | 4/2002 | Takeuchi | 713/320 |
| 2002/0157030 A1* | 10/2002 | Barker et al. | 713/320 |
| 2003/0074464 A1* | 4/2003 | Bohrer et al. | 709/232 |
| 2003/0221026 A1* | 11/2003 | Newman | 710/8 |
| 2004/0003296 A1* | 1/2004 | Robert et al. | 713/300 |
| 2004/0088590 A1* | 5/2004 | Lee et al. | 713/300 |
| 2005/0105545 A1* | 5/2005 | Thousand et al. | 370/442 |
| 2008/0209246 A1* | 8/2008 | Marks et al. | 713/323 |
| 2008/0239978 A1* | 10/2008 | Karam et al. | 370/252 |
| 2009/0080433 A1* | 3/2009 | Wertheimer | 370/394 |

OTHER PUBLICATIONS

Mike Bennett, Wael William Diab Energy Efficient Ethernet and 802.1 IEEE 802 Plenary Atlanta, GA Nov. 16, 2007.*
Scott Powell et al., "A Gigabit 'Subset PHY' Approach for 10GBASE-T Energy Efficient Ethernet," Atlanta, Georgia, Nov. 2007.

* cited by examiner

*Primary Examiner* — Vincent Tran
(74) *Attorney, Agent, or Firm* — Duane S. Kobayashi

(57) ABSTRACT

A hybrid technique in energy efficient Ethernet (EEE) physical layer devices (PHYs). A hybrid approach is defined that combines multiple low power modes. In one embodiment, the hybrid approach uses low power idle (LPI) and subset PHY techniques that can be selectively activated.

18 Claims, 3 Drawing Sheets

HYBRID TECHNIQUE IN ENERGY EFFICIENT ETHERNET PHYSICAL LAYER DEVICES

This application claims priority to provisional application No. 61/028,362, filed Feb. 13, 2008, which is incorporated by reference herein, in its entirety, for all purposes.

BACKGROUND

1. Field of the Invention

The present invention relates generally to Ethernet systems and, more particularly, to a hybrid technique in energy efficient Ethernet (EEE) physical layer devices (PHYs).

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

In designing an energy efficient solution, one of the considerations is the traffic profile on the network link. For example, many network links are typically in an idle state between sporadic bursts of data, while in other network links, there can be regular or intermittent low-bandwidth traffic, with bursts of high-bandwidth traffic. An additional consideration for an energy efficient solution is the extent to which the traffic is sensitive to buffering and latency. For example, some traffic patterns (e.g., HPC cluster or high-end 24-hr data center) are very sensitive to latency such that buffering would be problematic. For these and other reasons, applying energy efficient concepts to different traffic profiles would lead to different solutions. These varied solutions can therefore seek to adapt the link, link rate, and layers above the link to an optimal solution based on various energy costs and impact on traffic, which itself is dependent on the application.

One solution to addressing low link utilization is to reduce the high data capacity when it is not needed, thereby saving energy. In other words, a link can use a high data rate when data transmission needs are high, and use a low data rate when data transmission needs are low. In another solution, the link can be designed to enter into a low power idle (LPI) mode where the bulk of the PHY and the energy on the link is turned off (put to sleep) when there is no data transmission. When data is transmitted, it is transmitted at full PHY capacity. While this low power idle mode can save the most power, it does present some challenges that make it unsuitable for a class of solutions that may have specific requirements such as low latency. What is needed therefore is a flexible and efficient link utilization mechanism.

SUMMARY

A hybrid technique in energy efficient Ethernet physical layer devices, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
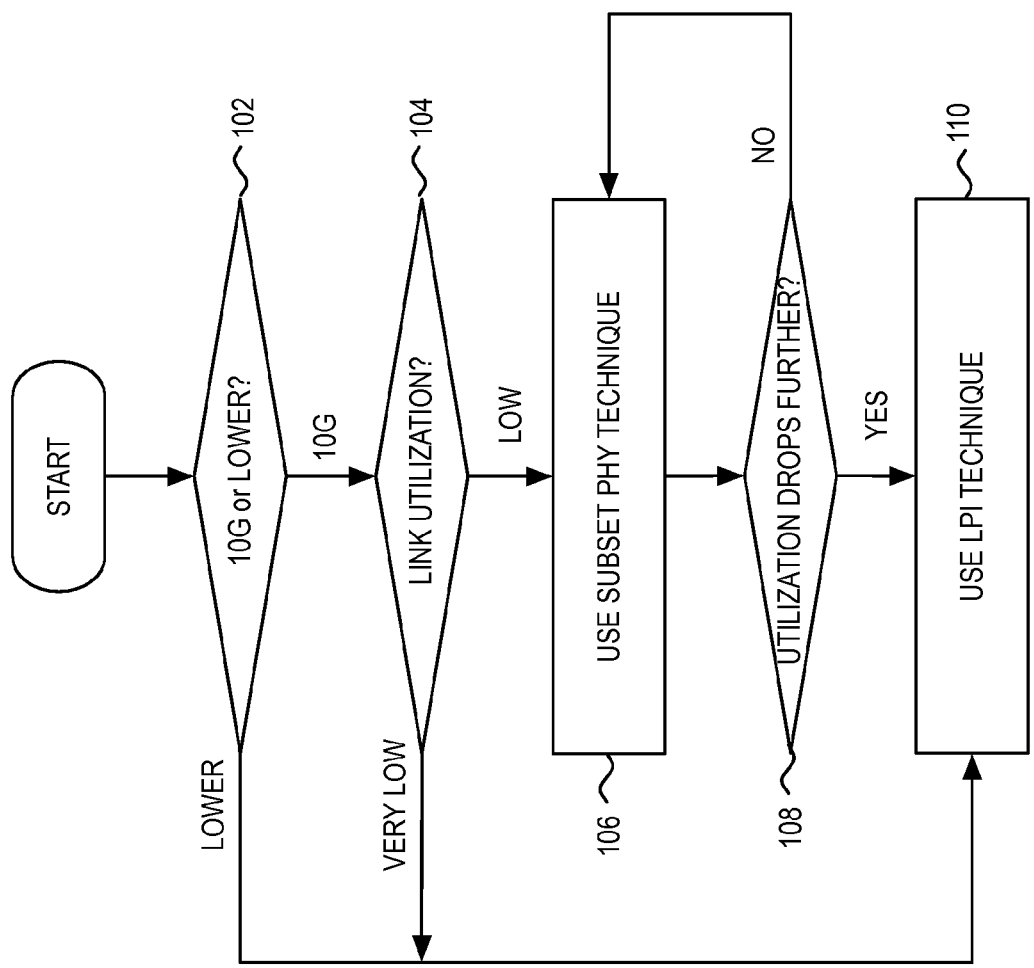
FIG. 1 illustrates a flowchart of a hybrid technique.
Figure 2:
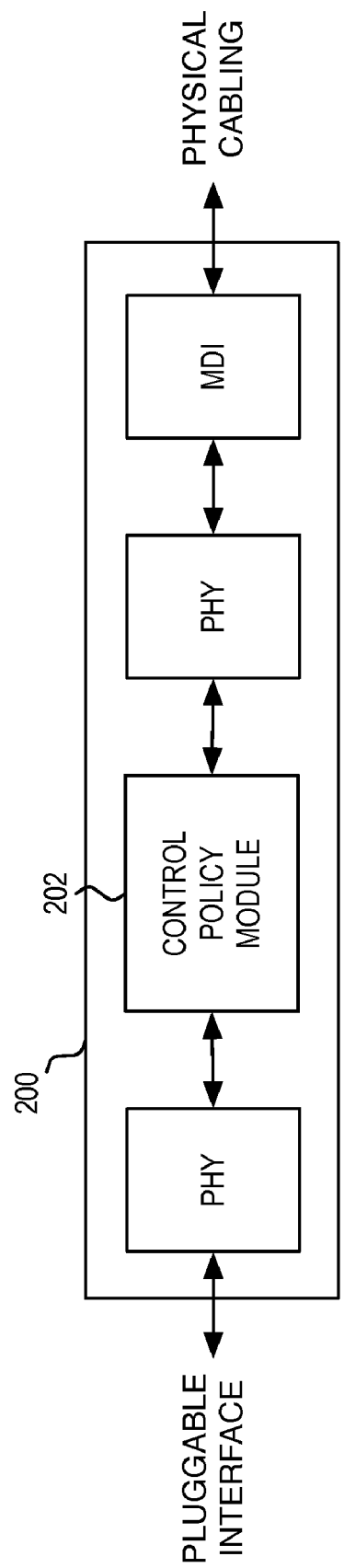
FIG. 2 illustrates an embodiment of an implementation of a control policy in a pluggable module.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet has become an increasingly pervasive technology that has been applied in various contexts such as twisted pair and backplane. IEEE 802.3az Energy Efficient Ethernet (EEE) continues to evaluate various methods for reducing energy used by reducing link rates during periods of low link utilization. In this process, a protocol would be defined that would facilitate transition to and from lower power consumption modes in response to changes in network demand.

In general, a reduction in link rate to a sub-rate of the main rate enables a reduction in power, thereby leading to energy savings. In one example, this sub-rate can be a zero rate, which produces maximum power savings.

One example of subrating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate. For example, a subset 1 G PHY can be created from a parent 10 GBASE-T PHY by a process that turns off three of the four channels. In another embodiment, the subset PHY technique is enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10 G enhanced core can be transitioned down to a 1 G link rate when idle, and sped back up to a 10 G link rate when data is to be transmitted.

Another example of subrating is through the use of a low power idle (LPI) technique. In general, LPI relies on turning the active channel silent when there is nothing to transmit. Energy is thereby saved when the link is off. Refresh signals can be sent periodically to enable wakeup from the sleep mode. In one embodiment, a sync signal can be used on the interfaces (i.e., medium dependent interface (MDI) and PHY/medium access control (MAC) interface) to allow for a quick wake-up from the sleep mode and maintain frequency lock. For example, on the MDI interface for a 10 GBASE-T signal, a simple PAM2 pseudorandom bit sequence could be used on pair A during LPI mode. This would not significantly increase the power that is consumed.

In general, both the subset and LPI techniques involve turning off or otherwise modifying portions of the PHY during a period of low link utilization. Due to their similarity in the complexity of their implementation, the overhead is relatively small and both subrating techniques can be incorporated practically in the same PHY. This gives increased flexibility to the application and application requirements in the upper layers. In general, both techniques present different solutions and challenges to the different applications and traffic patterns from a networking perspective (above the PHY).

Consider, for example, the issues presented by the LPI technique. LPI is favorable when there is very low link utilization. Moderate utilization, on the other hand, may necessitate buffer (batch) and burst traffic shaping. This buffer and burst traffic shaping would be counter to broader system issues such as the smoothing out of traffic on the network. Moreover, the buffer and burst technique may be unsuitable for use in enterprise switching networks because it adds cost, latency, and jitter and makes the energy efficiency less predictable. It should also be noted that LPI can be deficient in certain traffic scenarios even under low to moderate traffic levels where the interpacket gap (IPG) is chopped up to the point that it is too small for the PHY to be able to go into or out of LPI. For example, take a 1000 byte packet stream at 10 G, which yields a packet size of 0.8 µs. With 8% utilization, that makes the IPG 9.2 µs. The PHY could then never get into LPI as the transition time is greater than the IPG. Even if LPI is used, there is also a great burden on the system to observe packet gaps that are small. Significant system resources would be needed to look at µs-type gaps. In general, most systems will look for much longer gaps to initiate LPI, hence the efficiency will be significantly lower than the ideal efficiency of the profile when looked at in retrospect.

Subset PHY techniques also have issues of their own. Subset PHYs are defined based on an initial negotiated speed. In other words, a first set of subset PHYs would be defined for a 10 G parent PHY, while a second set of subset PHYs would be defined for a 1 G parent PHY. These subset PHY specifications are designed to support rapid switching between data rates based on the initial parent PHY. As a result, numerous modes of operation would need to be supported, thereby increasing the complexity of the test matrix.

Subset PHY techniques also have the disadvantage of not saving energy in areas that are just above the chosen sub-rate. For example, if the sub-rate was 25%, a 27% profile would yield zero savings.

For these and other reasons, neither the subset nor LPI techniques alone are ideal. It is therefore a feature of the present invention that a hybrid approach can be defined that combines both subset and LPI techniques. In this approach, both techniques can be used together in a manner that is contrary to conventional proposals that are focused on sole and independent operation.

To illustrate the operation of a hybrid technique, reference is now made to FIG. 1, which illustrates an example of a method of hybrid PHY operation. As illustrated, the process begins at step 102 where a determination is made as to the type of PHY. In this example, it is first determined whether it is a 10 G PHY or lower. If it is determined at step 102 that it is a lower than 10 G PHY, then the process continues to step 110 where the LPI technique is used. If, on the other hand, it is determined at step 102 that it is a 10 G PHY, then the process continues to step 104 where a link utilization rate is examined.

If it is determined at step 104, that the link utilization rate is very low (e.g., less than 1%), then the process continues to step 110 where the LPI technique is used. This is reflective of the greater power savings benefit that can be realized by the LPI technique in very low utilization environments. If, on the other hand, it is determined that the link utilization is moderately low (e.g., 1%-10%), then the process would continue to step 106, where the subset PHY technique is used.

While the subset PHY technique is being used, it may be determined at step 108 that the link utilization drops even further (e.g., below a certain threshold). If such is the case, the LPI technique may prove beneficial and the process would then continue to step 110 where a transition from the subset technique to the LPI technique would occur. If, on the other hand, it is determined at step 108 that the link utilization does not drop far enough, then the subset PHY technique would continue to be used. Here, it should be noted that the threshold that is used in the determination of step 108 need not be the same as that used at step 104. Rather, the threshold can be defined to exist at whatever point at which the incremental benefits of switching from the subset technique to the LPI technique would outweigh the costs of such a switch.

It should be noted that while the above example was in the context of a 10 G PHY, the principles of the present invention can be expanded to accommodate higher rate PHYs (e.g., 40 G, 100 G, etc.), including non-copper PHYs such as P2P Gig, 10 G, 40 G and P2MP (PON) 1 G, 10 G, etc. Here, the same hybrid technique can be used where different utilization levels can trigger subset and LPI techniques. Additionally, non-standard PHY speeds (e.g., 2.5 G, 5 G, 7.5 G, etc.) can also be accommodated in optimizing the link utilization process. For example, a moderate link utilization such as 11%-25% could dictate that a subset 2.5 G PHY is used. Similar link utilization levels could also be used for 5 G, 7.5 G, etc. in optimizing the power savings relative to link utilization.

As noted above, subset PHY techniques have the disadvantage of not saving energy in areas that are just above the chosen sub-rate. For this reason, if latency is not an issue and the profile is above the highest sub-rate on average, LPI could be used initially. This would assume that the IPG is not a problem and/or some buffering can be tolerated to create big gaps. When the profile drops to something within the first sub-rate, then the subset PHY technique can be used, and when the profile drops to something really low, LPI can be used again.

As has been described, the hybrid LPI and subset technique takes advantage of the benefits of both techniques. While each of the techniques are similar in that they turn portions of the PHY off, the hybrid technique is designed to leverage the two techniques separately without being burdened with the costs imposed by exclusive operation of either technique. As an example, one advantage of this hybrid technique is the ability to run streaming applications such as audio-video bridging (AVB), which would not work well with just LPI.

In general, the principles of the present invention provide a mechanism by which multiple sub-rating techniques can be used to conserve power in the PHY. Switching between the multiple sub-rating techniques can be enabled through an analysis of the link utilization by an EEE control policy. As would be appreciated, the EEE control policy can be based on an analysis of various link-related parameters. In one embodiment, the EEE control policy can be implemented in a layer above the PHY (i.e., MAC or higher layer), although in an alternative embodiment, the EEE control policy can be implemented completely or partially in the PHY itself to enable legacy support. In one example, an enhanced pluggable module 200 can be designed to include Layer 2 or higher functionality, this while retaining conventional connectivity of enhanced pluggable module 200 to a MAC chip in the host system. As illustrated, enhanced pluggable module 200 can include a higher-layer control policy module 202 that can assist in the control policy execution. As would be appreciated, the particular location of the EEE control policy in a given application would be implementation dependent.

Figure 3:
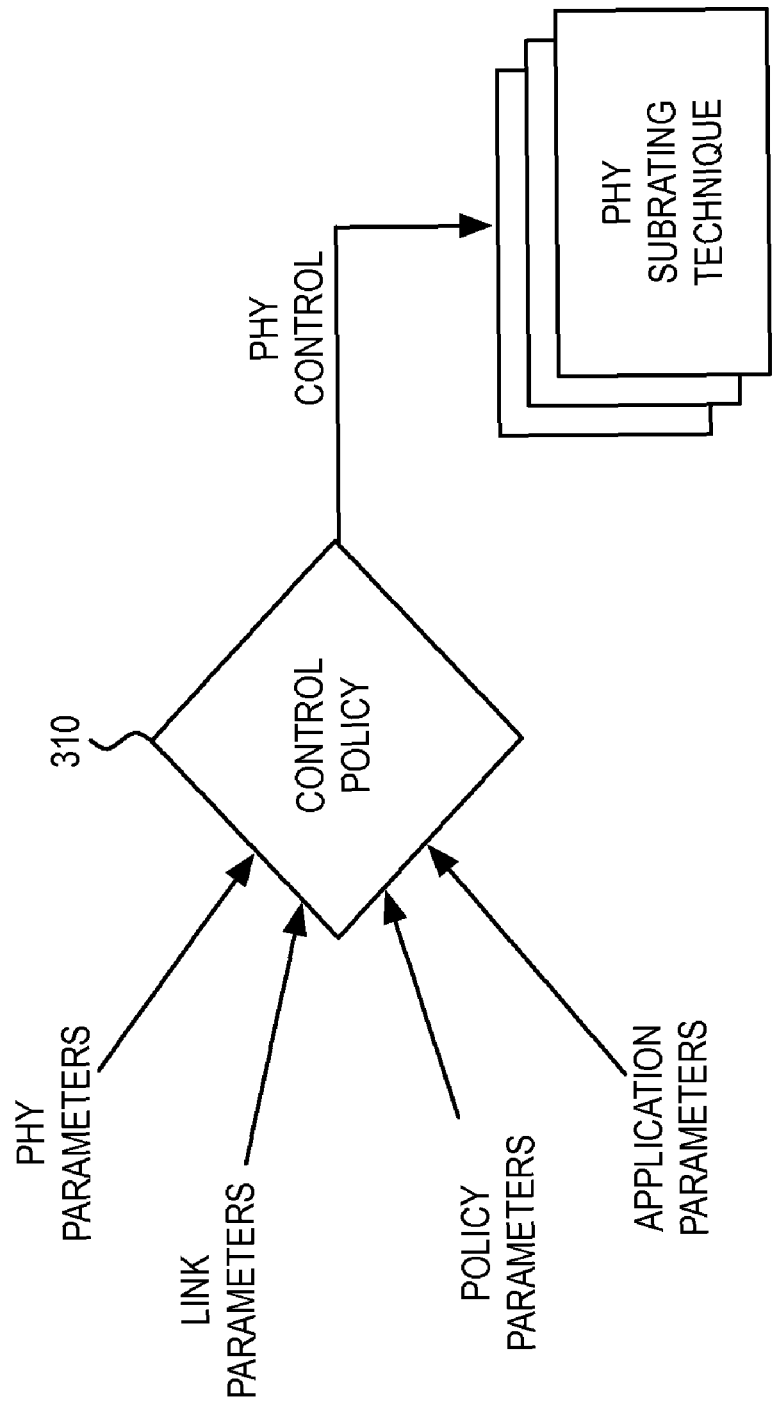
FIG. 3 illustrates a control policy for a hybrid energy efficient Ethernet PHY.

To further illustrate the principles of the present invention, reference is now made to FIG. 3. As illustrated, control policy 310 can be used to generate a PHY control signal that can be used by the PHY to select from a plurality of PHY subrating techniques (e.g., subset, LPI, etc.). The specific choice of the PHY subrating technique is based on a decision process performed by control policy 310.

In effecting a decision process, control policy 310 can receive various parameters such as PHY parameters, link parameters, policy parameters, and application parameters. PHY parameters can relate to the operational characteristics or capabilities of the PHY itself, examples of which would include the supported link rates available, the different modes of operation (e.g., subset modes), transition characteristics, etc. Link parameters can relate to those parameters that enable an analysis of the link utilization. A simple of example of such a parameter is a traffic buffer fullness, which can be compared to one or more thresholds. In another example, the link parameters can include burstiness parameters (e.g., size of the bursts, time between bursts, idle time, etc.) that enable a determination of the actual link utilization. Policy parameters can relate to those parameters that can govern the analysis and/or operation of the control policy. For example, policy parameters can include link utilization thresholds, IT policies, user parameters, etc. Finally, application parameters can relate to those parameters that govern the given application requirements.

As would be appreciated, the specific set of parameters and the relative analysis used by control policy 310 would be implementation dependent. Regardless of the mechanism used, it is significant that the PHY control generated by control policy 310 enables a leveraging of multiple PHY subrating techniques. The relative usage of such PHY subrating techniques enables the strengths of the different PHY subrating techniques to be exploited without regard to the hindrances encountered by their relative weaknesses.

It should be noted that the principles of the present invention can be broadly applied to various contexts, such as in all PHYs that implement EEE (e.g., backplane, twisted pair, optical, etc.). Moreover, the principles of the present invention can be applied to standard or non-standard (e.g., 2.5 G, 5 G, etc.) link rates, as well as future link rates (e.g., 40 G, 100 G, etc.). It should also be noted that the principles of the present invention can be applied to a given link either asymmetrically or symmetrically.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An energy efficiency method, comprising:
    operating a physical layer device in an active power mode;
    identifying a first link utilization level during operation of said physical layer device;
    if said identified link utilization level is within a first range, then transitioning said physical layer device from said active power mode to a subset physical layer device mode;
    monitoring said link utilization level while said physical layer device is in said subset physical layer device mode; and
    if said monitored link utilization level enters a second range that is lower than said first range, then transitioning said physical layer device from said subset physical layer device mode to a low power idle mode.

2. The method of claim 1, wherein said transitioning comprises transitioning only one direction of a link.

3. The method of claim 1, wherein said transitioning comprises transitioning both directions of a link.

4. The method of claim 1, wherein said monitoring is performed by a control policy in said physical layer device.

5. The method of claim 1, wherein said monitoring is performed by a control policy in a Layer 2 or higher device.

6. An energy efficiency system, comprising:
    a physical layer device that supports multiple subrating operation modes, wherein each of said multiple subrating operation modes represent different levels of power saving modes by said physical layer device; and
    a control module that generates a control signal based on an analysis of a link utilization level, said control signal being used to select between said multiple subrating operation modes that are supported by said physical layer device, said selection enabling said physical layer device to operate in a power saving mode that is identified by said analysis of said link utilization level, wherein said multiple subrating operation modes includes a low power idle mode and a subset physical layer device mode.

7. The method of claim 6, wherein said control module is located in a media access control device.

8. The method of claim 6, wherein said control module is located in said physical layer device.

9. The method of claim 6, wherein said control module generates said control signal based on an analysis of physical layer device parameters in addition to said link utilization level.

10. The method of claim 6, wherein said control module generates said control signal based on an analysis of policy parameters in addition to said link utilization level.

11. The system of claim 6, wherein said control module is located in a device in a layer higher than said media access control device.

12. The system of claim 6, wherein said physical layer device and said control module are contained in a pluggable module that is designed to interface with a media access control device.

13. An energy efficiency method, comprising:
    receiving one or more link parameters;
    generating a physical layer device control signal based on a link utilization level indicated by said one or more link parameters; and
    selecting between a plurality of physical layer device subrating modes based on said generated physical layer device control signal.

14. The method of claim 13, wherein said generating comprises generating based on physical layer device parameters.

15. The method of claim 13, wherein said generating comprises generating based on policy parameters.

16. The method of claim 13, wherein said receiving comprises receiving in a control module contained in said physical layer device.

17. The method of claim 13, wherein said receiving comprises receiving in a control module contained in a Layer 2 or higher device.

18. The method of claim 13, wherein said receiving comprises receiving in a control module contained in a pluggable module that is designed to interface with a media access control device.

* * * * *

UNITED STATES PATENT AND TRADEMARK OFFICE
CERTIFICATE OF CORRECTION

| | |
|---|---|
| PATENT NO. | : 8,286,007 B2 |
| APPLICATION NO. | : 12/369026 |
| DATED | : October 9, 2012 |
| INVENTOR(S) | : Diab et al. |

It is certified that error appears in the above-identified patent and that said Letters Patent is hereby corrected as shown below:

Col. 6, line 63, insert --, wherein said selecting comprising selecting between a low power idle mode and a subset physical layer device mode-- after "signal".

Signed and Sealed this
Fourth Day of December, 2012

David J. Kappos
*Director of the United States Patent and Trademark Office*